United States Patent
Ahn

(10) Patent No.: US 7,692,342 B2
(45) Date of Patent: Apr. 6, 2010

(54) OUTER ROTOR OF MOTOR FOR DIRECT DRIVE-TYPE WASHING MACHINE

(75) Inventor: Byung Hwan Ahn, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 11 days.

(21) Appl. No.: 10/562,437

(22) PCT Filed: Nov. 8, 2005

(86) PCT No.: PCT/KR2005/003758

§ 371 (c)(1),
(2), (4) Date: May 14, 2008

(87) PCT Pub. No.: WO2006/054842

PCT Pub. Date: May 26, 2006

(65) Prior Publication Data

US 2008/0224552 A1    Sep. 18, 2008

(30) Foreign Application Priority Data

Nov. 16, 2004    (KR)    ............ 10-2004-0093599

(51) Int. Cl.
*H02K 1/32*    (2006.01)
(52) U.S. Cl. .................... 310/61; 310/64
(58) Field of Classification Search .......... 310/61, 310/62, 58, 64
See application file for complete search history.

(56) References Cited

U.S. PATENT DOCUMENTS

| | | | |
|---|---|---|---|
| 6,396,177 B1 * | 5/2002 | Shin et al. | 310/63 |
| 2002/0053838 A1 * | 5/2002 | Okuda | 310/59 |
| 2003/0151315 A1 | 8/2003 | Choi et al. | 310/58 |

FOREIGN PATENT DOCUMENTS

| | | | |
|---|---|---|---|
| EP | 1 018 795 B1 | | 3/2008 |
| JP | 2001-339925 | * | 12/2001 |
| WO | WO 2004/069020 A2 | | 8/2004 |

* cited by examiner

*Primary Examiner*—Nguyen N Hanh
(74) *Attorney, Agent, or Firm*—KED & Associates LLP

(57) ABSTRACT

Objects of the present invention is to provide an outer rotor of a motor for a direct drive drum type washing machine, in which a structure of the outer rotor is improved, to resolve throbbing of the outer rotor at the time of high speed rotation, and consequential noise, and to provide a variety of products.

For this, the outer rotor having a rotor frame with a bottom, a side wall extended from a circumference of the bottom substantially perpendicular to the bottom, and magnets mounted on an inside of the side wall, wherein the bottom of the rotor frame is elevated in a direction of extension of the side wall on the whole.

17 Claims, 6 Drawing Sheets

OUTER ROTOR OF MOTOR FOR DIRECT DRIVE-TYPE WASHING MACHINE

TECHNICAL FIELD

The present invention relates to a motor for a drum type washing machine, and more particularly, to an outer rotor of a motor applicable to a direct drive drum type washing machine.

BACKGROUND ART

The drum type washing machine, washing laundry by using friction between laundry and drum rotated by driving force of a motor in a state detergent, washing water, and the laundry are introduced into the drum, gives almost no damage to the laundry, causes no entangling of the laundry, and provides a washing effect of pounding and rubbing the laundry.

A system in which the driving force is transmitted from the motor to a drum, not directly, but indirectly through a belt wound on a motor pulley, and a drum pulley causes an energy loss and generates much noise in a power transmission process.

In order to solve problems of the related art drum type washing machine, a direct drive drum type washing machine is introduced.

The direct drive drum type washing machine will be described.

There is a stator fixedly secured to a rear wall of a tub which holds washing water therein. A washing shaft has one end connected to a rear wall of a drum in the tub for washing the laundry while rotating, and the other end passed through the rear wall of the tub, and connected to the rotor. The rotor may be an outer rotor which rotates on an outer side of the stator.

As the rotor rotates by an electromagnetic action between the stator and the rotor through above structure, the rotation force is transmitted to the drum directly through the washing shaft.

A structure of the outer rotor will be described with reference to FIGS. 1 and 2.

Referring to FIGS. 1 and 2, the outer rotor 'R' is provided with a rotor frame 100 of steel plate, and magnets 'M' attached to an inside surface of a side wall 120 of the rotor frame 100, wherein the rotor frame of steel plate has a stepped portion formed in a circumferential direction at a side wall 120 extended from a bottom 110 thereof substantially perpendicular thereto for seating the magnets 'M'.

Accordingly, since the stepped portion supports the magnets 'M' when the magnets 'M' are attached to the inside surface of the side wall 120 of the rotor frame 100, fabrication of the rotor is easy.

Moreover, the rotor frame 100 has a plurality of cooling fins 130 around center of the bottom 110 in a radial direction, for blowing air toward a stator (not shown) when the rotor rotates, to cool down heat from the stator.

The cooling fins 130 are formed by lancing in a direction of an opened portion, and pass through holes 140 formed by the lancing serve as vents.

Along with this, there are embossed portions 150 between adjacent cooling fins 130 on the bottom 110 of the rotor frame 100 for reinforcing the rotor 13, each with a drain hole 160 for draining water.

However, the related art outer rotor 'R' has the following drawbacks.

At the time of high speed rotation, such as spinning for drying laundry, the drum type washing machine with the outer rotor 'R' shows heavy throbbing of the side wall 120 of the rotor frame 100 of steel plate caused by electromagnetic interaction (i.e., attraction and repelling force) with respect to the stator, to generate noise from the motor.

That is, the related art outer rotor is not favorable for a motor output and noise because the opened portion of the related art outer rotor having the magnets mounted thereon is far from the bottom, and, consequently, has difficulty in maintaining balance during rotation of the rotor as much as the distance 'D' is great.

Moreover, in a case it is intended to project the cooling fins to an outside of the rotor frame for providing variety in the products, the cooling fins projected as much as lengths of the cooling fins increase a space the motor occupies in the washing machine.

When it is intended to stack the outer rotor before transportation to a production line, or assembly in the production line, the cooling fins of the outer rotor disposed on a lower side are likely to deform due to weight of the rotors stacked thereon.

DISCLOSURE

Technical Problem

An object of the present invention is to provide an outer rotor of a motor for a direct drive type washing machine, in which a structure of an outer rotor applicable to a drum type washing machine, and the like, is improved for providing a variety of products, preventing deformation of the cooling fin when the rotors are stacked even if the cooling fins are projected outwardly, and resolving the throbbing of the rotor and consequential noise generation at the time of high speed rotation of the rotor by reducing a distance between a bottom of the outer rotor and an end of the opened portion to shift a balancing position of the outer rotor to a center.

Technical Solution

The object of the present invention can be achieved by providing an outer rotor having a rotor frame with a bottom, a side wall extended from a circumference of the bottom substantially perpendicular to the bottom, and magnets mounted on an inside of the side wall, wherein the bottom of the rotor frame is elevated in a direction of extension of the side wall on the whole.

Preferably, the outer rotor is constructed of steel plate by pressing.

Preferably, the rotor frame includes a plurality of cooling fins projected from the bottom to a direction opposite to a direction of extension of the side wall, and a plurality of pass through holes in the bottom. Preferably, the cooling fins and the pass through holes are formed by lancing. That is, it is preferable that the pass through holes are formed as the cooling fins are bent.

Preferably, the bottom has a height of the elevation of with respect to a lower end of the side wall the same with a height of the projection of the cooling fin from the bottom substantially, for stable stacking of the outer rotors. That is, it is preferable that the bottom of the rotor frame has a gap from a floor when the outer rotor is placed on the floor with the opened portion thereof facing upward, such that lower ends of the side wall and the cooling fins are in contact with the floor.

The cooling fin is sloped by an angle from the bottom of the rotor frame, or has a right angle, substantially upright.

The cooling fin may be formed at one side of the pass through hole on an opposite side of a rotation direction of the motor at the time of spinning, for blowing air toward the stator through the pass through hole at the time of spinning.

Preferably, the cooling fin has an acute angle from a horizontal plane of the pass through hole in the bottom of the rotor frame, for effective blow of air through the pass through holes.

The cooling fin is sloped by an angle α from the bottom of the rotor frame, wherein cooling fins at adjacent pass through holes may be formed in opposite directions alternately, for blowing a fixed rate of air through the pass through holes even if the rotation direction of the rotor is changed.

In another aspect of the present invention, an outer rotor having a rotor frame with a bottom, a side wall extended from a circumference of the bottom substantially perpendicular to the bottom, and magnets mounted on an inside of the side wall, wherein the bottom of the rotor frame is elevated in a direction of extension of the side wall on the whole, and the rotor frame includes a plurality of cooling fins projected from the bottom to a direction opposite to a direction of extension of the side wall, and a plurality of pass through holes formed in the bottom.

In another aspect of the present invention, an outer rotor having a rotor frame with a bottom, a side wall extended from a circumference of the bottom substantially perpendicular to the bottom, and magnets mounted on an inside of the side wall, wherein the bottom of the rotor frame is elevated in a direction of extension of the side wall on the whole, and the rotor frame includes a plurality of cooling fins projected from the bottom to a direction opposite to a direction of extension of the side wall, and a plurality of pass through holes formed in the bottom by lancing at the same time with the pass through holes.

Advantageous Effects

The present invention having above configuration has the following advantages.

Even if the cooling fins 130 are provided on an outside of the outer rotor 'R' for providing a variety of products by improving a structure of the outer rotor 'R' applicable to a drum type washing machine, the present invention can prevent deformation of cooling fins when the rotors are stacked.

That is, when the outer rotors 'R' are left in a state the outer rotors 'R' are stacked before transportation to a production line or assembly in the production line, though the cooling fins 130 of the outer rotor on a lower side of the stack of rotors are liable to deform, because the outer rotor of the present invention has the cooling fins within the height of the side wall 120 of the outer rotor 'R', the outer rotor of the present invention can prevent deformation of the cooling fins.

Moreover, in the related art, in the case the cooling fins are projected to an outside of the rotor frame for providing variety in the products, though the cooling fins projected as much as lengths of the cooling fins increase a space the motor occupies in the washing machine, the outer rotor 'R' of the present invention can avoid the deformation of the cooling fins even if the cooling fins 130 are projected to an outside of the rotor.

In the meantime, by reducing a distance between the bottom and an end of the opened portion of the outer rotor to shift a position of balance of the outer rotor 'R' to the middle of the rotor, the throbbing of the rotor frame and consequential generation of noise from the motor can be prevented when the rotor rotates at a high speed.

DESCRIPTION OF DRAWINGS

The accompanying drawings, which are included to provide a further understanding of the invention, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings.

Figure 1:
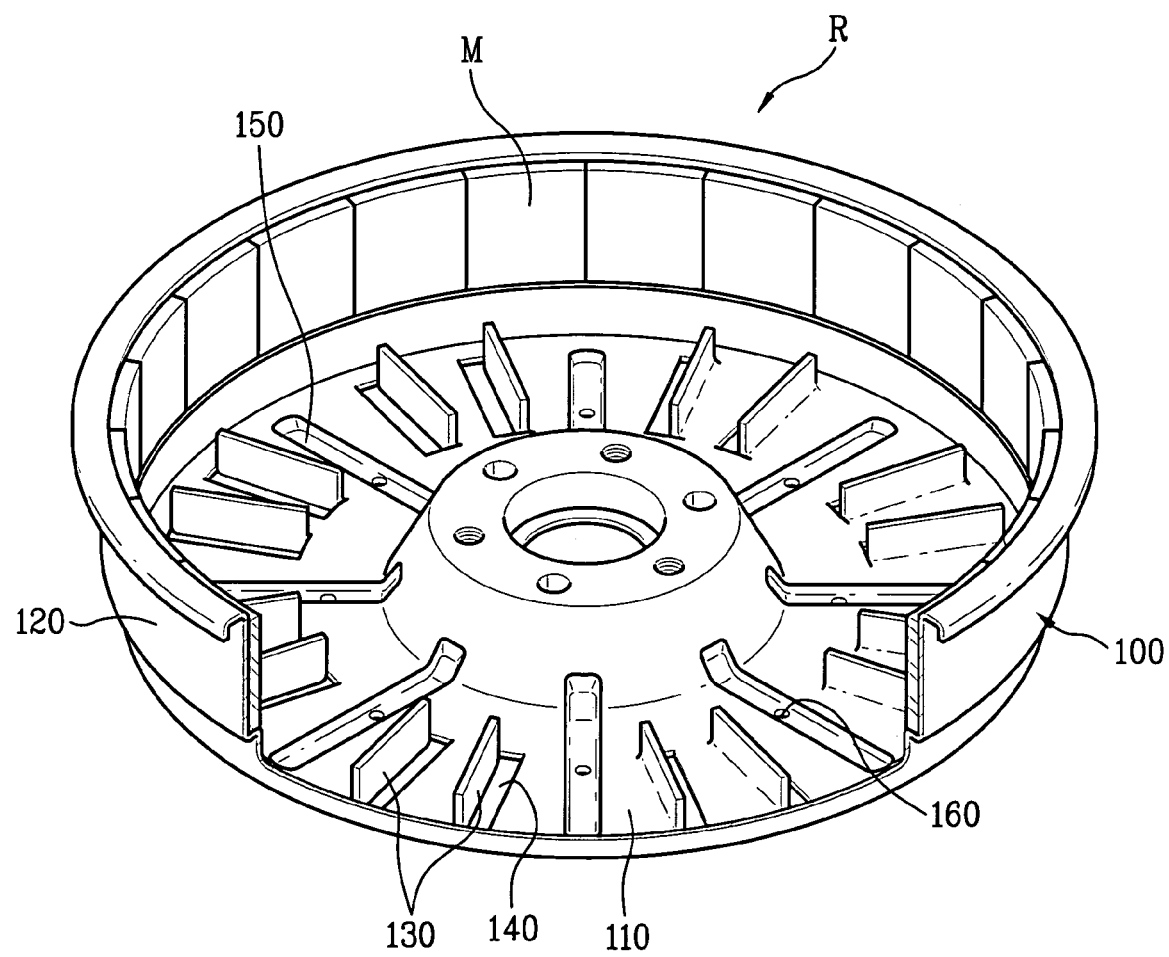
FIG. 1 illustrates a perspective view of a related art outer rotor.
Figure 2:
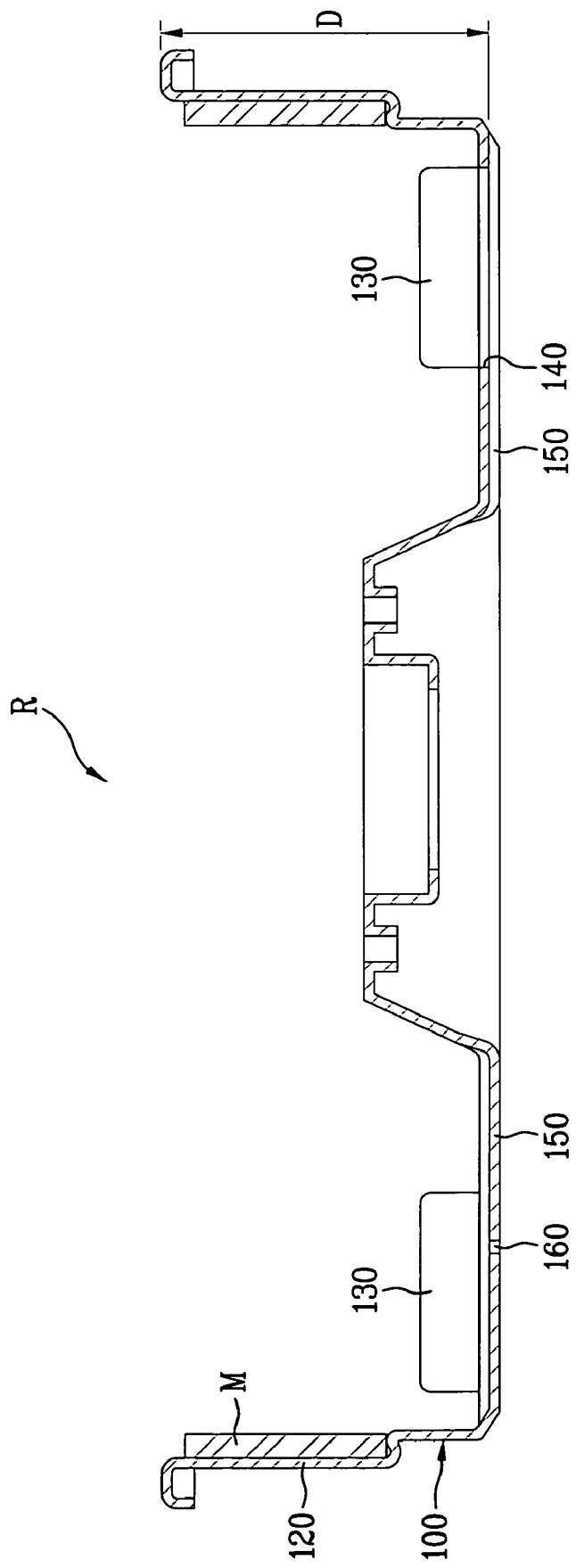
FIG. 2 illustrates a section of the outer rotor in FIG. 1.
Figure 3:
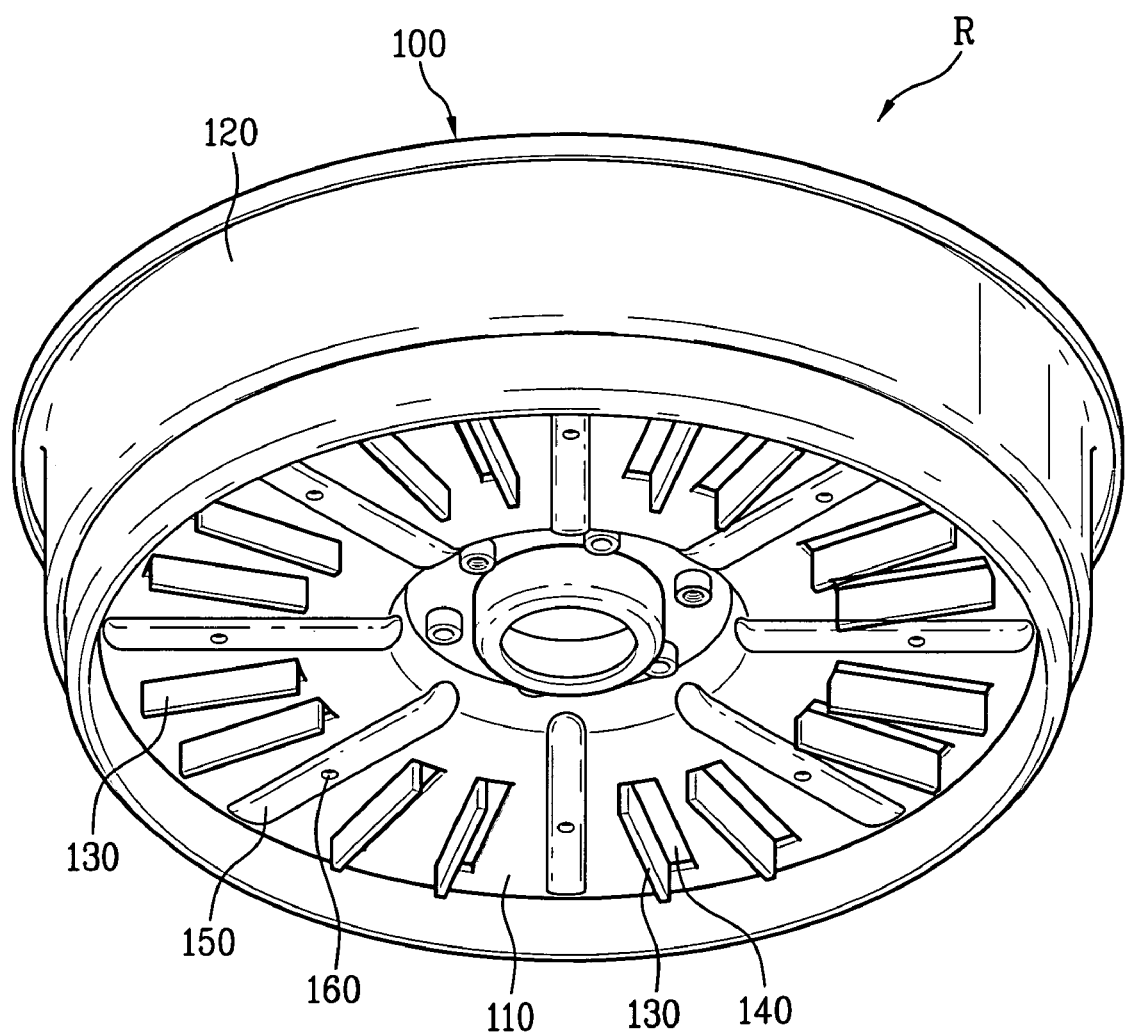
FIG. 3 illustrates a bottom perspective view of an outer rotor in accordance with a preferred embodiment of the present invention.
Figure 4:
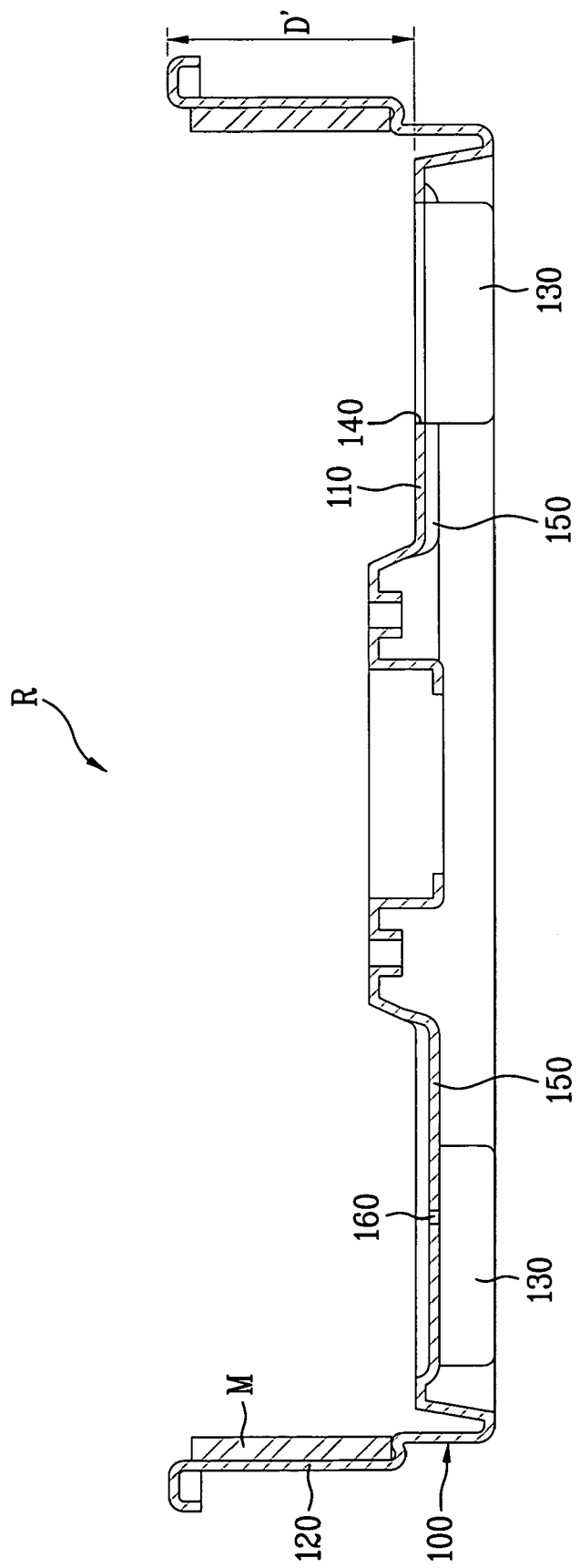
FIG. 4 illustrates a section of the outer rotor in FIG. 3.

FIG. 3 illustrates a bottom perspective view of an outer rotor in accordance with a preferred embodiment of the present invention, and FIG. 4 illustrates a section of the outer rotor in FIG. 3.

Referring to FIGS. 3 and 4, the outer rotor includes a rotor frame 100 having a bottom 110, and a side wall 120 extended from a circumference of the bottom substantially perpendicular to the bottom, wherein the bottom of the rotor frame is elevated in a direction of extension of the side wall on the whole, and magnets are mounted on an inside of the side wall.

That is, the bottom of the rotor frame 100 is positioned at a middle of a height of the side wall 120 of the rotor frame 100.

It is preferable that the rotor frame is constructed of steel plate, for easy formation by pressing, while obtaining required strength.

The rotor frame 100 has a plurality of cooling fins 130 projected outwardly from the bottom, and a plurality of pass through holes 140 formed in the bottom.

The cooling fins 130 cause an air flow when the rotor is rotated, and the pass through holes 140 serve as vents for in/out flow of air It is preferable that the cooling fins 133, and the pass through holes 140 are formed by the lancing. That is, both the cooling fins, and the pass through holes can be formed at a time, to improve productivity.

It is preferable that the cooling fins 130 are formed at a right angle from the bottom of the rotor frame, for easy formation and reducing processing tolerance.

However, the cooling fins 130 may be formed at an acute angle from the bottom of the rotor frame. In this case, though it is not easy to form the plurality of cooling fins at the same angle, a stronger air flow can be formed.

It is preferable that the height of elevation of the bottom with respect to a lower end of the side wall 120, and the height of projection of the cooling fin from the bottom are the same substantially. That is, a lower end of the side wall and a lower end of the cooling fin are on the same plane, for stable stacking of the rotor frame.

In the meantime, it is preferable that the cooling fin 130 is formed at one side of the pass through hole 140 serving as a vent on a side opposite to a rotation direction of the motor at the time of spinning.

The magnets 'M' are attached to an inside of the side wall 120 of the rotor frame 100.

It is preferable that a stepped portion is provided at the side wall 120 of the rotor frame of the outer rotor 'R' for supporting the magnets 'M'.

There are embossed portions 150 between adjacent cooling fins 130 on the bottom of the rotor frame 100 for reinforcing the rotor, each with a drain hole 160 for draining water.

The operation of the present invention will be described.

Even in a case the cooling fins are directed to an outside of the rotor frame 100 for providing a variety of products by improving a structure of the outer rotor 'R' applicable to a drum type washing machine, since the cooling fin 130 does not project beyond the height of the side wall 120 of the rotor, deformation of the cooling fin 130 can be prevented when the outer rotors 'R' are stacked.

Along with this, in the case the cooling fins are projected to an outside of the rotor frame for providing variety in the products, though the cooling fins projected as much as lengths of the cooling fins increase a space the motor occupies in the washing machine, the outer rotor 'R' of the present invention can avoid the deformation of the cooling fins even if the cooling fins 130 are projected to an outside of the rotor.

In the meantime, by reducing a distance "D"' between the bottom and an end of the opened portion of the outer rotor to shift a position of balance of the outer rotor 'R' to the middle of the rotor, the throbbing of the rotor frame and consequential generation noise from the motor can be prevented.

The cooling fins 130 on the bottom 110 of the outer rotor 'R' formed in a radial direction blow air toward the stator through the pass through holes 140 when the rotor rotates, to cool heat from the stator.

Moreover, the embossed portions 150 between adjacent cooling fins 130 on the bottom 110 of the rotor reinforce strength of the rotor 13, the drain holes 160 therein serves to drain water.

MODE FOR INVENTION

Another embodiments of the present invention will be described with reference to FIGS. 5 to 8.

Figure 5:
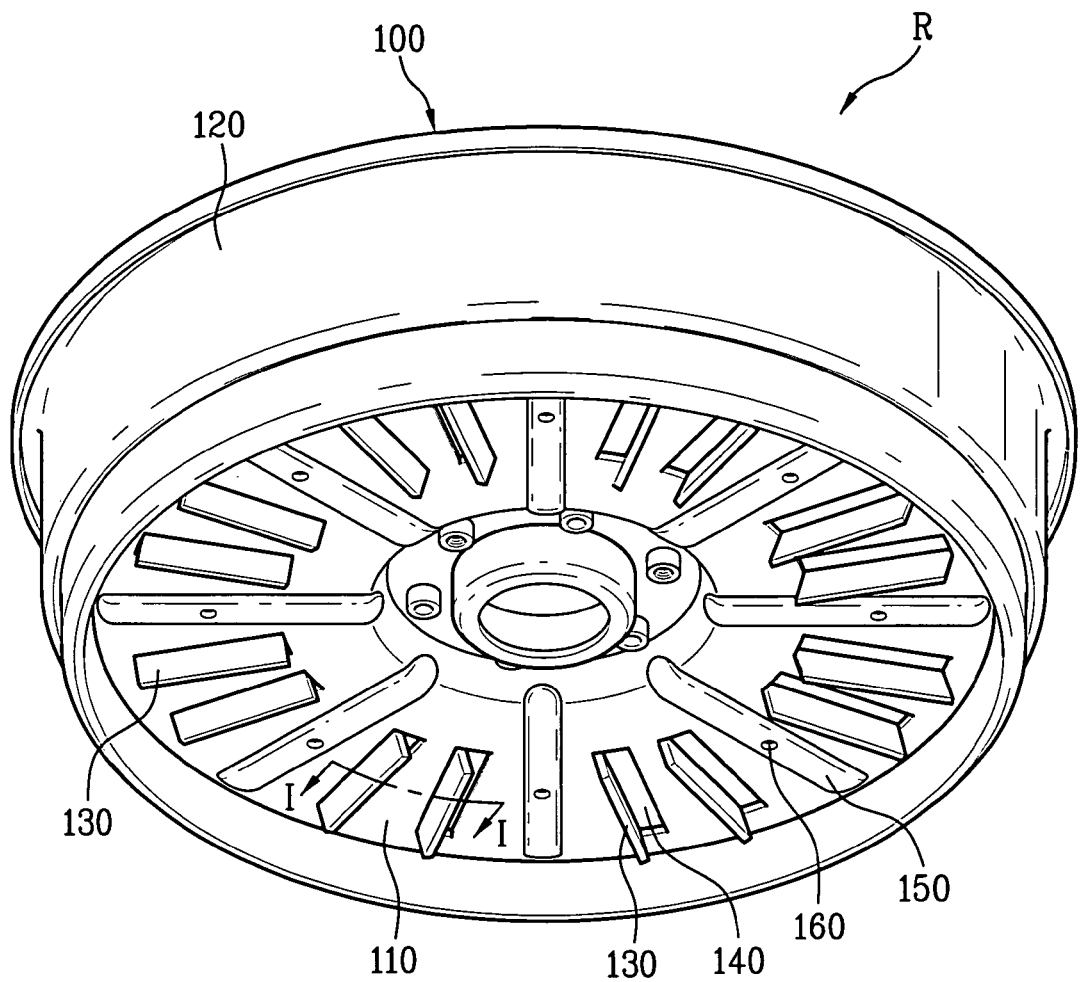
FIG. 5 illustrates a bottom perspective view of an outer rotor in accordance with another preferred embodiment of the present invention.
Figure 6:
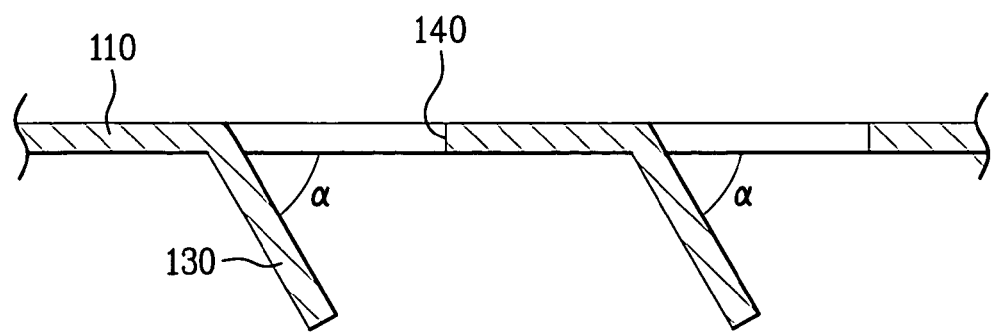
FIG. 6 illustrates a section across a line I-I in FIG. 6.
Figure 7:
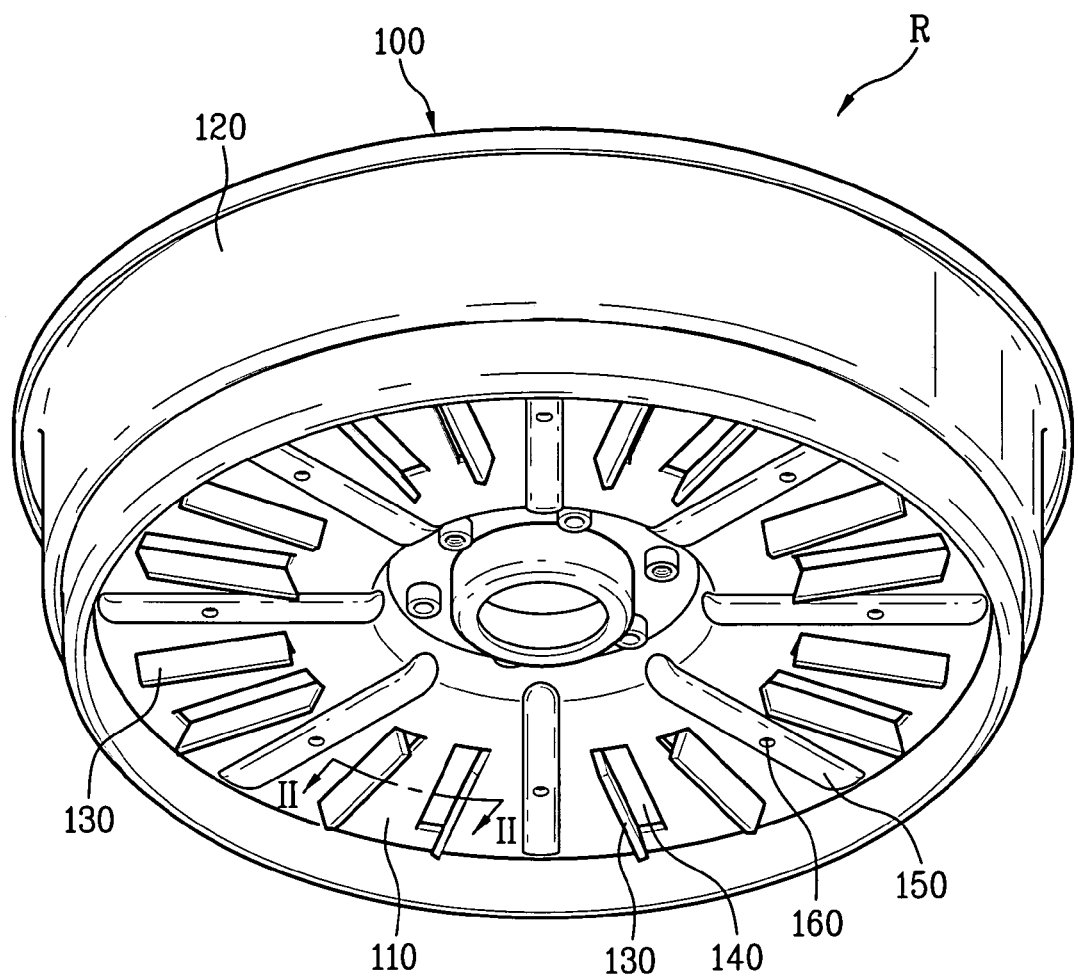
FIG. 7 illustrates a bottom perspective view of an outer rotor in accordance with another preferred embodiment of the present invention.
Figure 8:
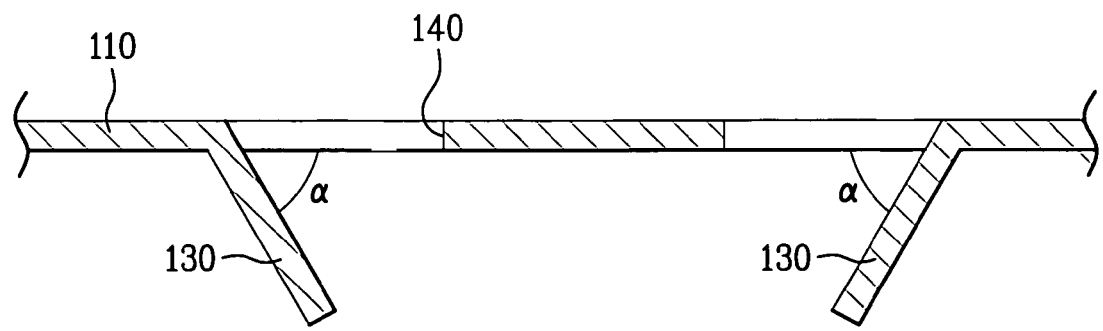
FIG. 8 illustrates a section across a line II-II in FIG. 7.

FIG. 5 illustrates a bottom perspective view of an outer rotor in accordance with another preferred embodiment of the present invention, FIG. 6 illustrates a section across a line I-I in FIG. 6, FIG. 7 illustrates a bottom perspective view of an outer rotor in accordance with another preferred embodiment of the present invention, and FIG. 8 illustrates a section across a line II-II in FIG. 7.

The outer rotors of the embodiments have angles and positions of formation of the cooling fins different from the foregoing embodiment, respectively.

Referring to FIGS. 5 and 6, the cooling fin 130 has an acute angle α from a horizontal plane of the pass through hole 140 of the bottom of the rotor frame 100.

It is preferable that the cooling fin 130 is formed at one side of the pass through hole 140 serving as a vent, in a direction opposite to a direction of rotation of the motor at the time or spinning for strong blow of air toward the stator in the spinning.

Referring to FIGS. 7 and 8, preferably the cooling fins 130 is sloped by an angle α from the bottom of the rotor frame 100 in an opposite direction with respect to an adjacent pass through hole 140, alternately.

In this instance too, it is preferable that the cooling fin 130 has an acute angle from the horizontal plane of the pass through hole 140 in the bottom of the rotor frame 100.

The opposite cooling fins 130 can blow air toward the pass through holes regardless of the rotation direction of the outer rotor.

In the meantime, it will be apparent to those skilled in the art that various modifications and variations can be made in the present invention without departing from the spirit or scope of the inventions.

INDUSTRIAL APPLICABILITY

The direct drive motor in a washing machine of the present invention permits to provide a drum type washing machine having less noise, fault, and power loss, improve workability at the time of fabrication of the rotor, and reduce vibration from the rotor by means of the washer provided on the inner or outer side of the rear wall of the rotor.

Moreover, the rotor of steel plate enabling pressing with good processability to require a shorter fabrication time period permits to provide a drum type washing machine having an improved productivity, the connector having a vibration mode different from the rotor permits to reduce vibration from the rotor to the shaft, and the supporter supports and maintains concentricity of the stator, effectively.

The invention claimed is:

1. An outer rotor comprising:
a rotor frame with a bottom and a side wall extended from a circumference of the bottom substantially perpendicular to the bottom; and
magnets mounted on an inside of the side wall,
wherein the bottom includes pass-though holes radially formed in the bottom and a plurality of cooling fins projecting from one side of respective ones of the pass-through holes toward an outside of the outer rotor, and
wherein at least a portion of the side wall circumscribes the cooling fins and is formed with a height that is at least substantially equal to or greater than that of the cooling fins.

2. The outer rotor as claimed in claim 1, wherein the cooling fins are sloped at one or more predetermined angles from the bottom of the rotor frame.

3. The outer rotor as claimed in claim 2, wherein the cooling fins are formed at one side of respective ones of the pass-through holes on an opposite side of a rotation direction of a motor including the outer rotor at a time of spinning.

4. The outer rotor as claimed in claim 3, wherein the cooling fins project at substantially right angles, upright, from the bottom of the rotor frame.

5. The outer rotor as claimed in claim 3, wherein the cooling fins project at one or more acute angles from a horizontal plane of respective ones of the pass-through holes in the bottom of the rotor frame.

6. An outer rotor as claimed in claim 1,
wherein the cooling fins are simultaneously formed in the bottom together with the pass-through holes by lancing.

7. The outer rotor as claimed in claim 1, wherein the magnets are mounted on a first portion of the side wall that extends in a first direction relative to the bottom and the cooling fins extend in a second direction relative to the bottom.

8. The outer rotor as claimed in claim 7, wherein the second direction is opposite to the first direction.

9. The outer rotor as claimed in claim 7, wherein the first portion of the side wall extends on one side of the bottom and a second portion of the side wall extends on an opposing side of the bottom, and wherein a height of the second portion of the side wall is at least substantially equal to or greater than a height of the cooling fins.

10. The outer rotor as claimed in claim 9, wherein a surface of each of the cooling fins located opposite the pass-through holes lies in substantially a same plane as an end surface of the second portion of the side wall.

11. The outer rotor as claimed in claim 10, wherein a bottom surface of the magnets are supported by a surface of the first portion of the side wall, said surface of the first portion of the side wall spaced from the bottom by a predetermined distance.

12. The outer rotor as claimed in claim 9, wherein the cooling fins are spaced from the second portion of the side wall.

13. The outer rotor as chimed in claim 1, wherein a first cooling fin projects at a first acute angle relative to the bottom and an adjacent second cooling fin projects at a second acute angle relative to the bottom.

14. The outer rotor as claimed in claim 13, wherein the first and second cooling fins project in directions that are at least substantially parallel to one another.

15. The outer rotor as claimed in claim 13, wherein the first and second cooling fins project in opposite directions.

16. The outer rotor as claimed in claim 13, wherein the first acute angle is at least substantially same as the second acute angle.

17. The outer rotor as claimed in claim 13, wherein the first and second acute angles are complementary angles.

* * * * *